(12) United States Patent
Senior (10) Patent No.: US 9,152,833 B2
(45) Date of Patent: Oct. 6, 2015

(54) ANTENNA CIRCUIT

(71) Applicant: Johnson Electric S.A., Murten (CH)

(72) Inventor: Kenneth Arthur Senior, Newport (GB)

(73) Assignee: Johnson Electric S.A., Murten (CH)

( * ) Notice: Subject to any disclaimer, the term of this patent is extended or adjusted under 35 U.S.C. 154(b) by 0 days.

(21) Appl. No.: 14/460,753

(22) Filed: Aug. 15, 2014

(65) Prior Publication Data

US 2015/0048163 A1     Feb. 19, 2015

(30) Foreign Application Priority Data

Aug. 15, 2013   (CN) ........................ 2013 1 0357214

(51) Int. Cl.
| G06K 7/10 | (2006.01) |
| H01Q 1/22 | (2006.01) |
| H01Q 7/00 | (2006.01) |
| H04B 5/00 | (2006.01) |
| G06K 19/077 | (2006.01) |

(52) U.S. Cl.
CPC .......... *G06K 7/10336* (2013.01); *H01Q 1/2216* (2013.01); *H01Q 1/2225* (2013.01); *H01Q 7/00* (2013.01); *H04B 5/0031* (2013.01); *G06K 7/10386* (2013.01); *G06K 19/07773* (2013.01); *G06K 19/07783* (2013.01); *G06K 2007/10524* (2013.01)

(58) Field of Classification Search
CPC ................ G06K 19/07749; G06K 19/07718; G06K 19/07752; G06K 19/07756; G03G 16/00; G03G 5/022; G08B 13/2414; G08B 13/2417; G08B 13/2437; H01L 21/707; Y10T 29/49117; Y10T 29/49155

USPC .................. 235/439, 441, 492, 486, 487, 375
See application file for complete search history.

(56) References Cited

U.S. PATENT DOCUMENTS

| 5,541,399 | A | 7/1996 | De Vall |
| 6,552,422 | B1 | 4/2003 | Schober |
| 6,973,716 | B2 | 12/2005 | Chung et al. |
| 7,286,053 | B1 * | 10/2007 | Gudeman et al. .......... 340/572.1 |

(Continued)

FOREIGN PATENT DOCUMENTS

| CN | 101609924 A | 12/2009 |
| EP | 1600887 A2 | 11/2005 |

(Continued)

OTHER PUBLICATIONS

Lochun, D. et al., "Reel-to-reel manufacturability of flexible electrical interconnects and radio-frequency identification structures," *Electronic Components and Technology Conference, 2002. Proceedings. 52nd*, pp. 686,689, 2002.

*Primary Examiner* — Thien M Le
(74) *Attorney, Agent, or Firm* — Muncy, Geissler, Olds & Lowe, P.C.

(57) ABSTRACT

An antenna circuit has a substrate, an antenna coil on only one side of the substrate, and a low-profile crossover element on the same side of the substrate and which bridges at least one turn of the antenna coil to electrically interconnect an inner end portion and an outer end portion of the antenna coil. The crossover element includes an electrically insulative layer on or adjacent to the turn of the antenna coil, a first electrically conductive layer above the electrically insulative layer, and a second electrically conductive layer which is above the first electrically conductive layer and which is of a different electrically conductive material.

22 Claims, 4 Drawing Sheets

(56) References Cited

U.S. PATENT DOCUMENTS

| | | |
|---|---|---|
| 7,555,826 B2 | 7/2009 | Armijo et al. |
| 7,742,009 B2 | 6/2010 | Li et al. |
| 2002/0020491 A1* | 2/2002 | Price et al. .................. 156/307.1 |
| 2003/0085788 A1* | 5/2003 | Yue ................................ 336/200 |
| 2004/0026033 A1 | 2/2004 | Price et al. |
| 2004/0189625 A1 | 9/2004 | Sato |
| 2006/0000915 A1* | 1/2006 | Kodukula et al. .............. 235/492 |
| 2007/0090955 A1* | 4/2007 | Cote et al. .................. 340/572.5 |
| 2008/0174434 A1* | 7/2008 | Strauser et al. ............ 340/572.3 |
| 2009/0021431 A1* | 1/2009 | Reppe .................... 343/700 MS |
| 2010/0328162 A1 | 12/2010 | Matsushita et al. |
| 2014/0293678 A1* | 10/2014 | Orlowski et al. ............. 365/148 |

FOREIGN PATENT DOCUMENTS

| | | |
|---|---|---|
| EP | 2482261 A2 | 8/2012 |
| JP | 2006-165050 A | 6/2006 |
| WO | WO 2006/073525 A1 | 7/2006 |
| WO | WO 2007/019762 A1 | 2/2007 |
| WO | WO 2013/141658 A1 | 9/2013 |

* cited by examiner

ANTENNA CIRCUIT

CROSS REFERENCE TO RELATED APPLICATIONS

This non-provisional patent application claims priority under 35 U.S.C. §119(a) from Patent Application No. 201310357214.X filed in The People's Republic of China on Aug. 15, 2013, the entire contents of which are hereby incorporated by reference.

FIELD OF THE INVENTION

The present invention relates to an antenna circuit, to a wireless radio-frequency communication circuit, for example being a RFID circuit and/or a near-field communication (NFC) circuit, having such an antenna circuit, to a mobile point-of-sales terminal utilising the antenna circuit, and to a method of forming a low-profile crossover element on a single-sided antenna circuit.

BACKGROUND OF THE INVENTION

At present, to provide a low-profile antenna circuit, a flexible circuit substrate is laminated on both major opposing surfaces with a metallic electrically conductive layer, in this case being copper. An antenna coil for use with an RFID circuit, NFC circuit or other wireless radio-frequency communication circuit is then etched or otherwise provided on a front said major surface, and a crossover element is provided on a rear said major surface. The crossover element is a short link track or trace of copper left by the removal of the rest of the copper layer on the rear major surface.

Through holes or vias are then formed between the front and rear major surfaces, interconnecting an inner end portion of the antenna coil with a first end of the crossover element and an outer end portion of the antenna coil with a second end of the crossover element. The through holes are then plated to electrically connect the antenna coil and the crossover element, thereby forming the antenna circuit.

However, the removal of such a large amount of copper from the rear major surface causes significant waste and increases manufacturing cost. The through holes can only be formed using laser or highly accurate drilling technology, which again leads to increased manufacturing time and a potentially higher scrap rate due to drilling position inconsistencies. Furthermore, the plating of the through holes disrupts the current flow, thereby altering the resistance of the circuit and thus reducing operational performance.

The present invention seeks to provide a solution to these problems.

SUMMARY OF THE INVENTION

According to a first aspect of the invention, there is provided an antenna circuit comprising a substrate, an antenna coil on only one side of the substrate, and a low-profile crossover element on the one side of the substrate and which bridges at least one turn of the antenna coil to electrically interconnect an inner end portion and an outer end portion of the antenna coil, the crossover element including a, preferably overprintable, electrically insulative layer on or adjacent to the turn of the antenna coil, a, preferably printable, first electrically conductive layer above the electrically insulative layer, and a, preferably electrodeposited, second electrically conductive layer which is above the first electrically conductive layer and which is of a different electrically conductive material.

Preferably, the electrically insulative layer on or adjacent to the turn of the antenna coil is overprintable, the first electrically conductive layer above the electrically insulative layer is printable, and the second electrically conductive layer which is above the first electrically conductive layer and which is of a different electrically conductive material is electrodeposited.

Optionally, the first electrically conductive layer may include noble metal particles, and in this case it is preferable that silver particles are utilised. This reduces or eliminates oxidation, particularly during manufacture. As an alternative or in addition, carbon particles could be utilised. This may aid in reducing cost whilst still enabling good electrical conductivity and a base layer for forming the second electrically conductive layer thereon.

Beneficially, the first electrically conductive layer may be a flowable conductive ink. This enables the crossover element to be quickly and easily applied across the antenna coil on the one side of the substrate.

The second electrically conductive layer is preferably an electroplated layer. This provides a more conductively robust path for current travelling through the crossover element. Furthermore, the second electrically conductive layer may be a non-noble metal, and for example may conveniently be copper. This is beneficial in more accurately matching a resistance of the antenna coil with that of the crossover element.

The inner end portion and the outer end portion of the antenna coil are preferably engaged with at least the first electrically conductive layer, which also overlaps the electrically insulative layer. This provides the crossover element with a robust connection to the antenna coil, which improves the longevity of the antenna circuit whilst also minimising the profile of the crossover element.

Advantageously, the second electrically conductive layer may overlap the first electrically conductive layer to electrically engage the inner end portion and the outer end portion of the antenna coil. By utilising both first and second different electrically conductive layers, being applied by different application means, a more robust connection is achieved by the crossover element with the end portions of the antenna coil.

According to a second aspect of the invention, there is provided a wireless radio-frequency communication circuit comprising an antenna circuit in accordance with the first aspect of the invention, and an IC chip electrically connected to the antenna coil, the substrate including a body portion and a chip-mounting portion cantilevered to the body portion, whereby the antenna coil extends around the body portion and along the chip-mounting portion, the IC chip being mounted on the chip-mounting portion so as to be in electrical communication with the antenna coil thereon.

Preferably, the mounting portion is a cantilevered tail which extends away from the body portion and the portion of the antenna coil provided thereon. This is advantageous in that the central region of the body portion bounded by the antenna coil may this be apertured for receiving componentry, for example, a display unit there within or there through.

The substrate may further comprise a housing-mounting portion which extends from the body portion and around the tail portion. This not only protects the chip-mounting portion, but also increases a number of fastening locations for attaching the wireless radio-frequency communication circuit to a device housing or support.

According to a third aspect of the invention, there is provided a mobile point-of-sales terminal comprising a handholdable housing, a data-entry user-interface at a surface of the handholdable housing, a display unit having a display screen on the handholdable housing for displaying data inputted via the data-entry user-interface, and a wireless radio-frequency communication circuit in accordance with the second aspect of the invention in the handholdable housing and through which the display unit extends.

According to a fourth aspect of the invention, there is provided a method of forming a low-profile crossover element on a single-sided antenna circuit, comprising the steps of: a] printing at a first side of a substrate of the antenna circuit a first electrically conductive layer on an electrically insulative layer bridging at least one turn of an antenna coil also on the said first side of the substrate; and b] electroplating a second electrically conductive layer on the first electrically conductive layer to electrically interconnect inner and outer end portions of the antenna coil.

According to a fifth aspect of the invention, there is provided an antenna circuit comprising a substrate, an antenna coil on only one side of the substrate, and a crossover element on the said one side of the substrate and which bridges at least one turn of the antenna coil to electrically interconnect an inner end portion and an outer end portion of the antenna coil, the crossover element comprising a rigid electrically insulative housing for bridging the at least one turn of the antenna coil, and an electrical conductor which extends through the electrically insulative housing and which electrically interconnects the inner and outer end portions of the antenna coil.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labelled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
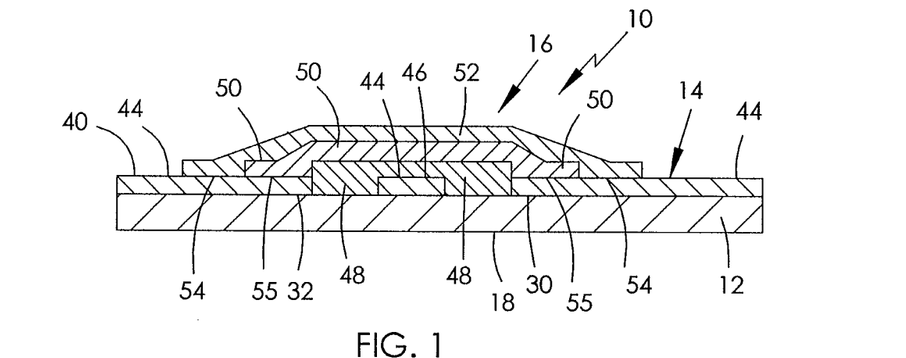
FIG. 1 is a diagrammatic cross-sectional view of a first embodiment of an antenna circuit having a crossover element applied between end portions of an antenna coil, in accordance with the first to fourth aspects of the invention.
Figure 5:
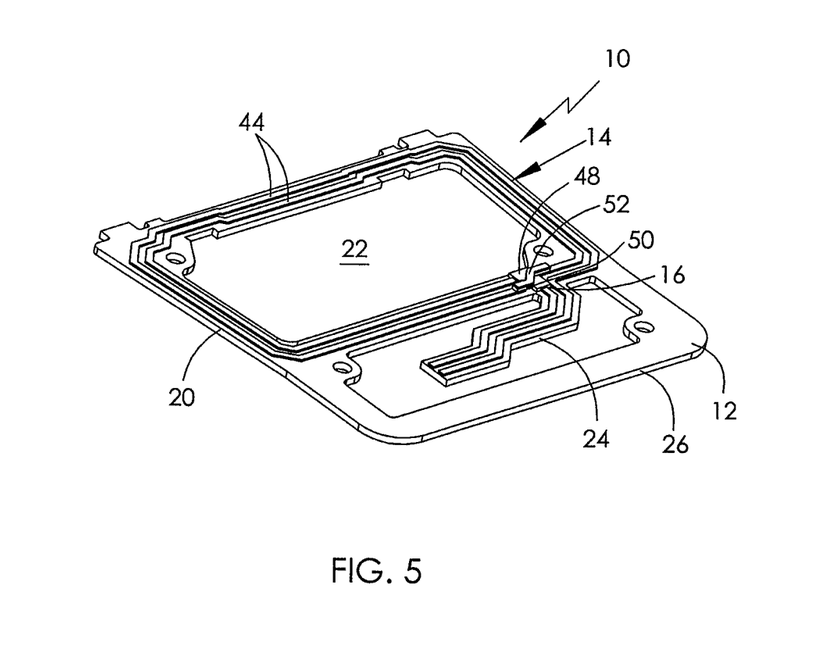
FIG. 5 shows a second electrically conductive trace applied to the first electrically conductive trace of FIG. 4.

Referring firstly to FIGS. 1 and 5 of the drawings, a first embodiment of an antenna circuit 10 comprises a, preferably flexible and imageable, circuit substrate 12, an antenna coil 14, and a low-profile crossover element 16. The flexible imageable circuit substrate 12 is unlaminated on a rear major surface 18, thereby being devoid of an electrically conductive layer, trace or circuit in particular relating to the antenna coil 14. More particularly, the rear major surface 18 of the substrate 12 presents a plastics non-metallised surface, and conveniently is supplied as such without requiring processing to remove a conductive laminate layer therefrom.

The substrate 12, in this embodiment, is stamped or otherwise formed to provide a continuous unbroken body portion 20 defining a display unit aperture 22, a tail portion 24 which extends in a cantilevered manner from one side of the body portion 20 and away from the display unit aperture 22, and an elongate strip-like mounting portion 26 which extends from opposing corners on a longitudinal side of the body portion 20 to encompass and thereby protect the tail portion 24.

Although the display unit aperture 22 is provided, the substrate may be unapertured or have apertures of different sizes as necessity dictates. Additionally or alternatively, although the tail portion 24 preferably extends away from the aperture 22, it may extend into the or an aperture of the substrate, or may be dispensed with if the antenna coil 14 is entirely provided on the body portion.

Mounting apertures 28 are provided on the substrate 12 for connection to a housing, chassis or module of a device in which the antenna circuit 10 is to be incorporated. In this case, two said mounting apertures 28 are provided at diametrically opposing interior corners of the body portion 20 and two said mounting apertures 28 are provided at diametrically opposing interior corners of the mounting portion 26.

Figure 9:
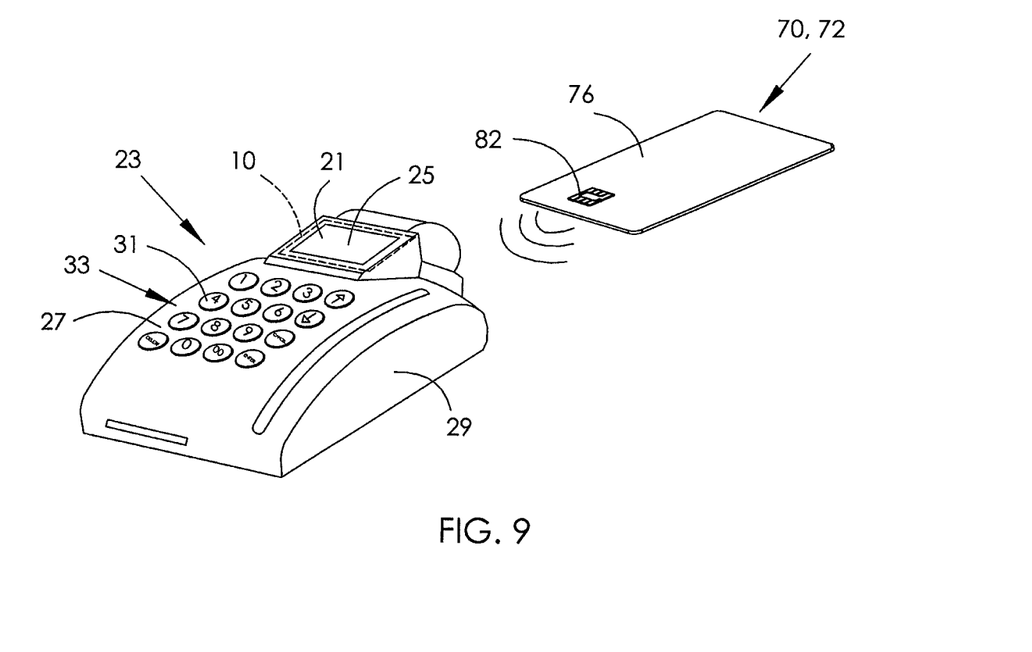
FIG. 9 shows a point-of-sales terminal having the antenna circuit with crossover element therein, and being used in conjunction with the smart-card or bank card shown in FIG. 8.

In this case, the display unit aperture 22 of the body portion 20 is dimensioned to receive a display unit 21 of a mobile point-of-sales or POS terminal 23. See FIG. 9. The body portion 20 therefore extends around a perimeter of a screen 25 of the display unit 21 of the POS terminal 23, sitting recessed relative thereto and just below a front surface 27 of a terminal housing 29. However, other positions of the antenna circuit 10 within the terminal housing 29 and forming a wireless radio-frequency communication circuit, such as a RFID circuit or a NFC circuit, can be considered and, for example, locating the antenna circuit 10 to encircle a data-entry user-interface 31, such as a keyboard 33, provided on the front surface 27 of the terminal housing 29 may be convenient, thereby enabling a larger antenna coil to be utilised.

The body portion 20 of the substrate 12 includes an inner end portion 30 of the antenna coil 14 and an outer end portion 32. Both the inner and outer end portions 30, 32 are adjacent to a proximal end 34 of the tail portion 24. The antenna coil 14 extends around the body portion 20, terminating at the inner and outer end portions 30, 32, and at a free distal end 36 of the tail portion 24 in preparation for attachment of a suitable IC chip 37 (see FIG. 8).

The front major surface 38 of the substrate 12 is pre-laminated with at least one electrically conductive coating 40, for example, being or including in this case copper. The antenna coil 14 is formed by etching or other suitable processing, whereby the laminated electrically conductive coating 40 is partially removed down to the plastics base surface 42 of the substrate 12 to leave the electrically conductive trace 44 around the body portion 20 and along the tail portion 24. The laminated electrically conductive coating 40 is wholly removed from the mounting portion 26.

The crossover element 16 therefore needs to be applied to bridge a portion 46 of the antenna coil 14 which passes between the inner and outer end portions 30, 32 and to the tail portion 24. Although the crossover element 16 of this embodiment bridges only one coil, turn or trace of the antenna coil 14, the crossover element 16 may bridge multiple coils, turns or traces passing between the inner and outer end portions 30, 32, as necessity dictates.

Figure 2:
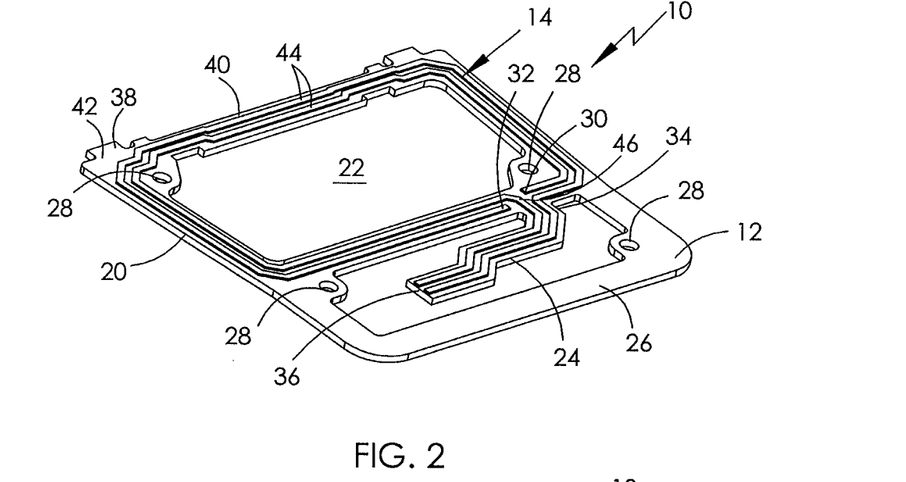
FIG. 2 is a perspective view of an imageable circuit substrate having an antenna coil on a front major surface thereof.
Figure 3:
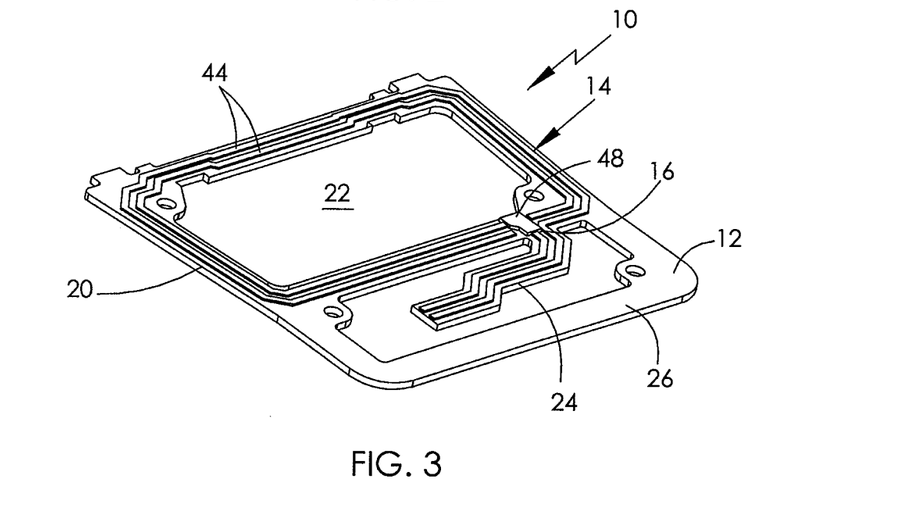
FIG. 3 is a view similar to that of FIG. 2, showing the antenna coil with a dielectric patch applied.
Figure 4:
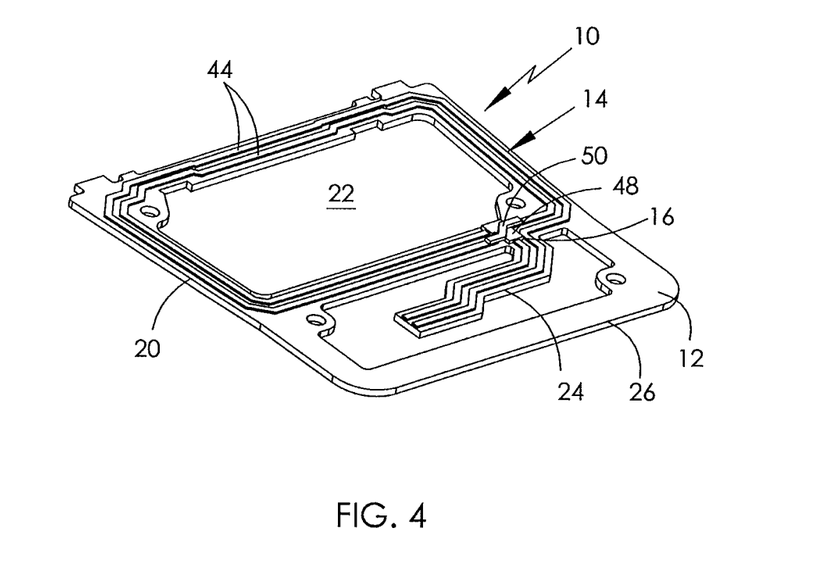
FIG. 4 shows a first electrically conductive trace applied to the dielectric patch.

To apply the crossover element 16, reference is now also made to FIGS. 2 to 4 of the drawings, in addition to FIGS. 1 and 5. As shown in FIGS. 2 and 5, an electrically insulative layer or dielectric layer 48 is first applied above and, in this case, on and overlapping the portion 46 of the trace extending between the inner and outer end portions 30, 32 of the antenna coil 14. Preferably, the electrically insulative layer 48 has a first dimension which at least matches an outer lateral extent of the antenna coil 14, and a second dimension which at least substantially matches a separation between the inner and outer end portions 30, 32.

Conveniently, the electrically insulative layer 48 may be a dielectric screen-printable UV-curable solvent-free ink, and for example may contain a urethane acrylate binder and/or magnesium silicate filler.

Referring to FIG. 3 and FIG. 5, an elongate first electrically conductive layer or trace 50 is applied above, and in this case on top of, the electrically insulative layer 48. A longitudinal extent of the first electrically conductive layer 50 overlaps the electrically insulative layer 48, thereby directly engaging the inner and outer end portions 30, 32 of the antenna coil 14.

The first electrically conductive layer 50 is preferably a printable thin film ink comprising noble metal particles, such as silver. The use of a noble metal is beneficial in preventing or reducing oxidation during manufacture, whilst also providing a suitable base layer for a subsequent electroplating process. However, it is feasible that the noble metal could be replaced or supplemented by non-noble metal electrically conductive particles, such as carbon.

Although the first electrically conductive layer 50 is preferably a flowable and curable electrically conductive PTF ink, other dielectric materials and/or application processes may be considered.

Referring to FIGS. 4 and 5, an elongate second electrically conductive layer or trace 52 is then applied above, and again in this case on top of, the first electrically conductive layer 50. The second electrically conductive layer 52 preferably does not contact the electrically insulative layer 48 but does engage with the first electrically conductive layer 50. A longitudinal extent of the second electrically conductive layer 52 is also greater than that of the first electrically conductive layer 50. As such, the second electrically conductive layer 52 overlaps the first electrically conductive layer 50 in at least a longitudinal direction and directly engages the inner and outer end portions 30, 32 of the antenna coil 14 at first engagement regions 54 adjacent to second engagement regions 55 of the first electrically conductive layer 50.

The second electrically conductive layer 52 is preferably an electroplated metal layer, in this case being copper. The first electrically conductive layer 50 provides a suitably platable base layer, thereby allowing the second electrically conductive layer 52 to be electroplated both thereon and onto the inner and outer end portions 30, 32 of the antenna coil 14 to complete the crossover element 16.

By providing an overprintable electrically insulative layer 48, a printable first electrically conductive layer 50 and an electrodeposited second electrically conductive layer 52, the crossover element 16 can thus be more easily tuned to achieve a resistance which matches or substantially matches that of the antenna coil 14. This leads to improved antenna performance due to the lack of significant change to current flow direction and the maintenance of a common electrically conductive material, which is particularly beneficial for broadcast antennas but also useful for reading and receiving antennas. The retaining of a low antenna profile due to the absence of any over coating or layers on the rear major surface 18 of the substrate 12 is also beneficial in allowing incorporation of the wireless radio-frequency communication circuit to which the antenna circuit 10 forms a part into existing POS terminal designs.

Additionally, or alternatively, this new antenna circuit 10 can be applied to a broadcastable or non-broadcastable smart-card 70 and/or non-contact bank card 72. See FIGS. 8 and 9.

Figure 8:
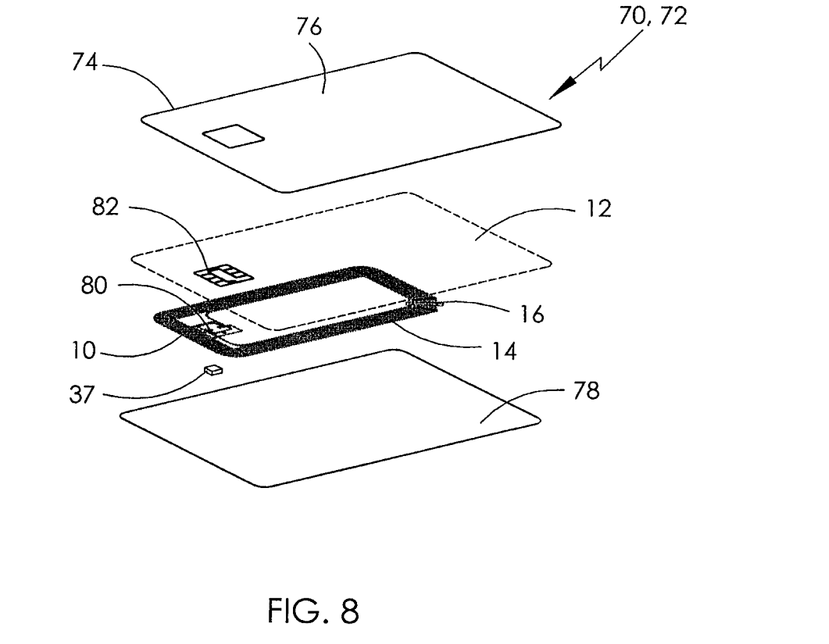
FIG. 8 shows an exploded perspective view of a broadcastable or non-broadcastable smart-card or non-contact bank card, having the antenna circuit with crossover element.

Referring to FIG. 8, the smart-card 70 or non-contact bank card 72 comprises a card body 74 formed of top and bottom substrates 76, 78 and the circuit substrate 12 interposed there between. In this case, the tail portion 24 of the substrate 12 is dispensed with.

A contact pad 80 is provided within the circuit antenna 14, and this includes an outwardly-facing electrical card-reader contact 82.

The IC chip 37 is attached to an underside of the contact pad 80, so as to be in electrical communication therewith, using flip-chip mounting technology or any other suitable electrical connection means.

Figure 6:
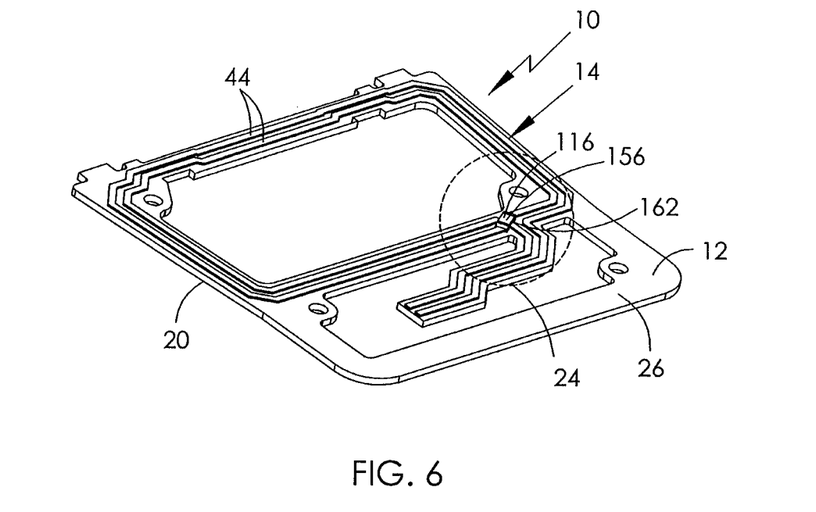
FIG. 6 is a perspective view of a second embodiment of an antenna circuit having a different crossover element applied between end portions of an antenna coil, in accordance with the fifth aspect of the invention.
Figure 7:
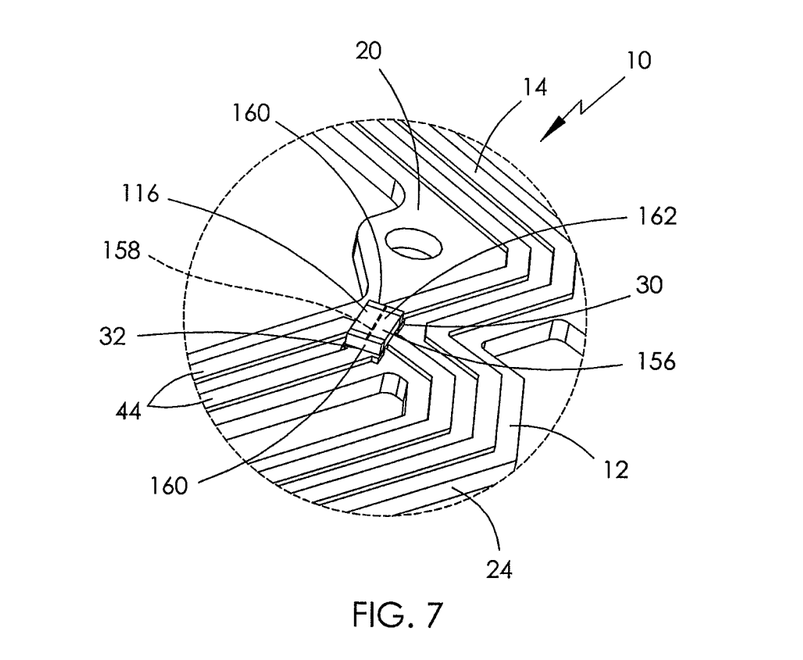
FIG. 7 is an enlarged portion of the antenna circuit shown in FIG. 6, more clearly showing the crossover element.

Referring now to FIGS. 6 and 7 of the drawings, a second embodiment of an antenna circuit 10 will now be described. The same references as used in the first embodiment are used to denote identical or similar parts, and therefore further detailed description is omitted.

The single-sided antenna circuit 10 comprises the circuit substrate 12, antenna coil 14 on the front major surface 38 of the substrate 12, and a crossover element 116 also on the front major surface 38 of the substrate 12. However, in this case, the crossover element 116 includes a rigid electrically insulative housing 156 for bridging the or each turn of the antenna coil 14 which passes between the inner and outer end portions 30, 32, and an electrical conductor 158 which passes through the electrically insulative housing 156 to electrically interconnect the inner and outer end portions 30, 32 of the antenna coil 14.

The electrical conductor 158 may be formed on an electrically insulative core or former, and this may be a ceramic core or former.

Preferably, the electrical conductor 158 is formed of a same material as that of the coils, traces or turns of the antenna coil 14. Therefore, in this case, it is preferable that the electrical conductor 158 is copper.

Terminal ends 160 of the electrical conductor 158 extend from the electrically insulative housing 156, and directly engage the inner and outer end portions 30, 32, respectively, for example, by soldering or brazing.

It may be convenient, in this second embodiment, to utilise a resistor 162 as the crossover element 116, and for example, the resistor 162 may have a zero ohm resistance. However, such a resistor 162 may be of a higher profile than the crossover element 116 of the first embodiment, thereby making incorporation into an existing design of a device more complicated without a redesign.

Alternatively, the crossover element 116 of the second embodiment may be a functional IC chip, a chip capacitor or other suitable electrical device. In these cases, the electrically insulative housing 156 would be an IC chip housing or a capacitor housing, as required. Preferably, such electrical device would be a dummy or passive component, being utilised solely for the purpose of the crossover and therefore not having any other function or forming a dynamic part of a circuit.

Furthermore, if the electrical conductor 158 of the second embodiment is of a different material than the antenna coil 14, then a circuit resistance will alter resulting in the potential of a performance drop.

Consequently, the arrangement of the second embodiment may be more suited to a non-broadcast wireless radio-communication circuit, such as that incorporated with a smart card or non-contact bank card.

Although RFID and NFC have been suggested as applications, any suitable far-field or near-field wireless radio-frequency communication can utilise the above-described antenna circuit.

It is thus possible to provide a single-sided antenna circuit which maintains a low-profile whilst not only improving antenna performance but also significantly reducing wasted material by not requiring an electrically conductive laminate on both sides of a circuit substrate.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of examples only, and various other modifications will be apparent to persons skilled in the field without departing from the scope of the invention as defined by the appended claims.

The invention claimed is:

1. An antenna circuit comprising a substrate, an antenna coil on only one side of the substrate, and a low-profile crossover element on said one side of the substrate and which bridges at least one turn of the antenna coil to electrically interconnect an inner end portion and an outer end portion of the antenna coil, the crossover element comprising an electrically insulative layer on or adjacent to said turn of the antenna coil, a first electrically conductive layer above the electrically insulative layer, and a second electrically conductive layer which is disposed directly on the first electrically conductive layer and which is of a different electrically conductive material, the substrate including a body portion and a chip-connecting portion connected on one end to the antenna coil.

2. An antenna circuit as claimed in claim 1, wherein the first electrically conductive layer is a printable thin film material.

3. An antenna circuit as claimed in claim 1, wherein the first electrically conductive layer includes noble metal particles.

4. An antenna circuit as claimed in claim 3, wherein the noble metal particles are silver particles.

5. An antenna circuit as claimed in claim 1, wherein the first electrically conductive layer includes carbon particles.

6. An antenna circuit as claimed in claim 1, wherein the first electrically conductive layer is a flowable conductive ink.

7. An antenna circuit as claimed in claim 1, wherein the first electrically conductive layer is non-oxidative or is resistant to oxidation.

8. An antenna circuit as claimed in claim 1, wherein the second electrically conductive layer is an electroplated layer.

9. An antenna circuit as claimed in claim 1, wherein the second electrically conductive layer is a non-noble metal.

10. An antenna circuit as claimed in claim 1, wherein the second electrically conductive layer is copper.

11. An antenna circuit as claimed in claim 1, wherein the first electrically conductive layer overlaps the electrically insulative layer to electrically engage the inner end portion and the outer end portion of the antenna coil.

12. An antenna circuit as claimed in claim 11, wherein the first electrically conductive layer directly engages the inner and outer end portions of the antenna coil.

13. An antenna circuit as claimed in claim 1, wherein the second electrically conductive layer overlaps the first electrically conductive layer to electrically engage the inner end portion and the outer end portion of the antenna coil.

14. An antenna circuit as claimed in claim 13, wherein the second electrically conductive layer directly engages the inner and outer end portions of the antenna coil.

15. A wireless radio-frequency communication circuit comprising an antenna circuit as claimed in claim 1, and an IC chip disposed in a card electrically connected to the antenna coil, wherein the antenna coil extends around the body portion and along the chip-mounting portion, the IC chip being connected to the chip-connecting portion so as to be in electrical communication with the antenna coil.

16. A wireless radio-frequency communication circuit as claimed in claim 15, wherein the chip-connecting portion extends away from the body portion and the portion of the antenna coil provided thereon.

17. A wireless radio-frequency communication circuit as claimed in claim 15, wherein the body portion includes a central aperture for receiving a display unit and which is surrounded by the antenna coil.

18. A wireless radio-frequency communication circuit as claimed in claim 15, wherein the substrate further comprises a housing-mounting portion which extends from the body portion and around the chip-connecting portion.

19. A mobile point-of-sales terminal comprising a handholdable housing, a data-entry user-interface at a surface of the handholdable housing, a display unit having a display screen on the handholdable housing for displaying data inputted via the data-entry user-interface, and a wireless radio-frequency communication circuit as claimed in claim 15 in the handholdable housing and through which the display unit extends.

20. A method of forming a low-profile crossover element on a single-sided antenna circuit, comprising the steps of:
   a] printing at a first side of a substrate of the antenna circuit a first electrically conductive layer on an electrically insulative layer bridging at least one turn of an antenna coil also on said first side of the substrate; and
   b] electroplating a second electrically conductive layer directly on the first electrically conductive layer to electrically interconnect an inner end portion and an outer end portion of the antenna coil.

21. An antenna circuit comprising:
   a substrate,
   an antenna coil on only one side of the substrate,
   a crossover element on said one side of the substrate and which bridges at least one turn of the antenna coil to electrically interconnect an inner end portion and an outer end portion of the antenna coil, the crossover element comprising a rigid electrically insulative housing for bridging said at least one turn of the antenna coil, and an electrical conductor which extends through the electrically insulative housing and which electrically interconnects the inner and outer end portions of the antenna coil, and a chip-connecting circuit disposed on the first side of the substrate in the same layer as the antenna coil and extending away from the crossover element perpendicular to the antenna coil.

22. An antenna circuit as claimed in claim 21, wherein the rigid electrically insulative housing is at least one of a resistor housing, an IC chip housing and a capacitor housing.

* * * * *